UNITED STATES PATENT OFFICE.

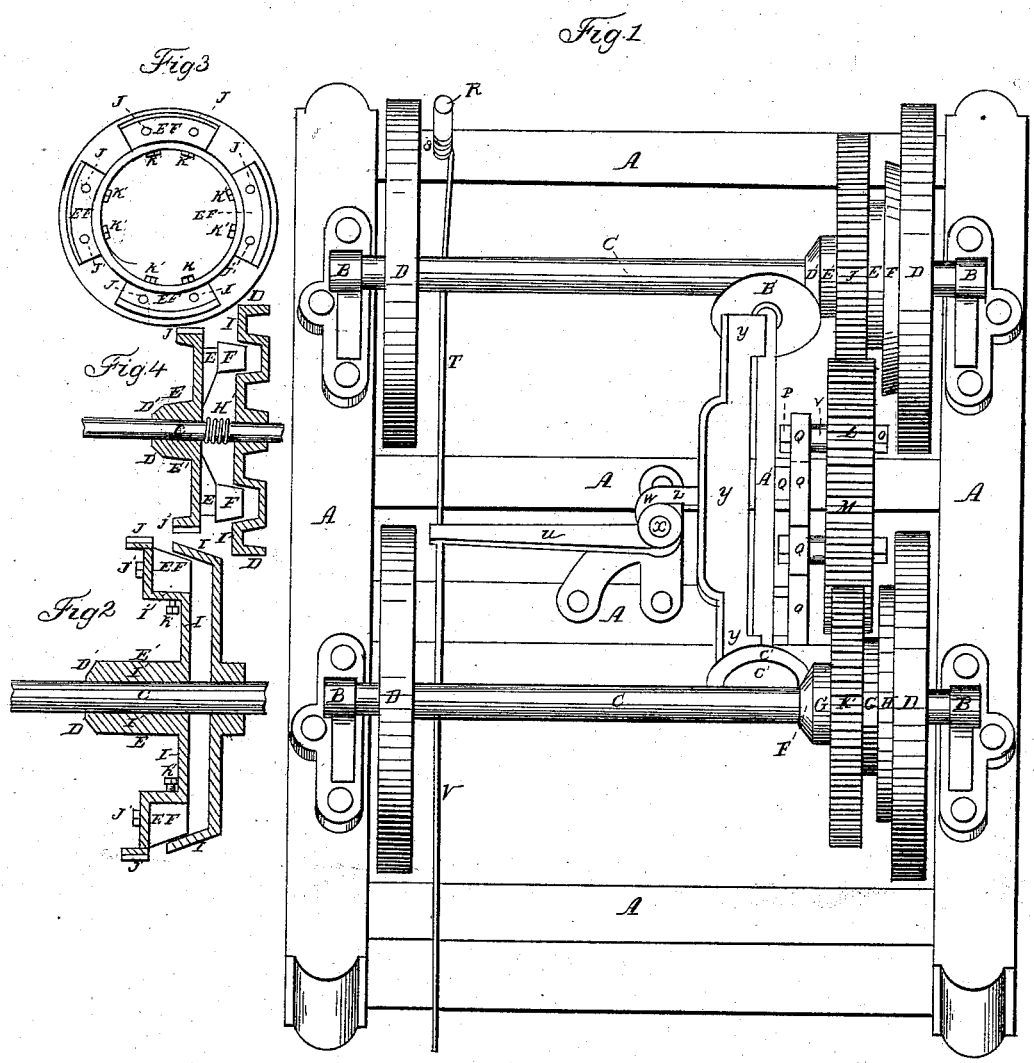

BIRDSILL HOLLY, OF SENECA FALLS, NEW YORK, ASSIGNOR TO HIMSELF, SILAS HEWIT, EDWARD S. LATHAM, AND ABEL DOWNS.

RAILROAD-CAR BRAKE.

Specification of Letters Patent No. 8,730, dated February 10, 1852.

*To all whom it may concern:*

Be it known that I, BIRDSILL HOLLY, of Seneca Falls, in the county of Seneca and State of New York, have invented a new and Improved Brake for Railroad-Cars, and that the following is a full, clear, and exact description of the same, reference being had to the accompanying drawings, which are referred to in and form a part of this description.

The drawings are on a scale of two inches to a foot.

Figure 1 is a perspective view of the under side of a four-wheeled rail-road-car truck, with my brake arranged and adapted to it. Figs. 2 and 3 show a modification of the mode of constructing the friction wheel. Fig. 4 shows the shape of the car wheels in Fig. 1, and the spring that frees the friction wheel.

The same letters show corresponding parts in the drawings.

In Fig. 1 A is the frame of the truck; B, B, B, B, are the braces in which the bearings of the axles run; C, C, are the axles; D, D, D, D, are the wheels which are shown without flanges and are single plate wheels constructed as shown in Fig. 4; E F is what I call a friction wheel whose axis is the axis of the axle of the car wheel. The part F is best made of wood and of hard wood, but metal may also be used. The part F is beveled on its outer face. The wheel D to which the friction wheel E F is applied has upon its inner side a projection which is shown at I, I in Fig. 4. This projection is continuous around the whole circumference of the wheel. The outer face of the friction wheel E F, and the surface of the projection I, I, that is next to that face have about the bevel shown in Fig. 4, and the friction wheel can run within the projection about the distance shown in Fig. 4; the surface of the projection next to the friction wheel must be bored or turned perfectly smooth; the amount of the bevel of the friction wheel and of the side of the projection may be diminished in order to produce greater friction between them, provided always that the bevel is great enough to allow the friction wheel to free itself readily from the projection. The part E of the friction wheel E F, is either of wood or metal and of one piece with the part F, or so fixed as to be solid with and move with it; as shown in the drawings, Figs. 1 and 4, the part E is cylindrical on its outer face. The friction wheel G H is in all respects constructed like the friction wheel E F.

J represents a cog wheel of metal which is firmly bolted to the friction wheel E F and runs with it as one piece. Each pair of the carwheels runs with its axle, as usual in rail-road-car wheels. The wheels J and E F run loose on the axle C, and are free to slide on it. K is another cog wheel of the same size and having cogs of the same size and number as the cog wheel J and constructed like it in all respects, and it is connected and runs with the friction wheel G H in the same manner as the cog wheel J with the friction wheel E F.

L is a cog wheel of metal which runs on the axle N; the nut O holds the wheel L on the axle N. P is a nut which holds the axle N firmly in the hanger Q; the nut O is on one end of the axle N and the nut P on the other end. M is another cog wheel of metal of the same size and having cogs of the same size and number as the cog wheel L, and constructed, arranged and running like it in all respects. The hanger Q is bolted firmly to the center cross pieces A, A, of the truck, and hangs down from them so as to support the cog wheels L and M. The cog wheel L runs in gear with the cog wheel J, the cog wheel M runs in gear with the cog wheel K, and the wheels L and M run in gear with each other also. The absolute size of the wheels J and K and of the wheels L and M is not material, if they are of adequate proportions, but the wheels J and K must be in all respects like each other for a reason hereafter stated. The wheels L and M will work best if, in all respects, like each other, but one may be larger than the other.

I have thus described my friction wheels and the manner in which I connect them with each other. I now proceed to describe the manner in which I cause the friction wheels and the parts that connect them to be brought into and out of action.

R is the lower end of a brake shaft or wheel shaft which projects upward in a convenient and accessible place on the car. This shaft is made in the usual manner so as, when turned around to wind around its lower end, a chain S which connects with a metallic rod T that is fastened to the long arm U of a bent lever of metal; V is a continuation of the rod T and runs to a lever upon the other truck of the car (it being supposed to be an eight-wheeled car, having two trucks) which operates another and similar brake on that truck, so that both brakes are operated by one brake-shaft; W is the short arm of the lever of which U is the long arm; the fulcrum of the lever is at X; Y is a frame of wood which is hung from the outer sides of the cross pieces A, A of the frame; it is so hung as to vibrate sidewise, that is to and from the inner sides of the cog wheels.

Z is a pin or projection of metal, running from the frame Y in a horizontal direction, and so placed that the short arm W may act against it.

A' is a shaft of metal which has firmly fastened on each end of it a wheel of metal. Q is one of these wheels and C' C' the other. The wheel B' runs against the inner end D' of the hub E' of the wheel J, and the wheel C' C' runs against the inner end F' of the hub G' of the wheel K.

The ends D' and F' of the hubs E' and G' and the faces of the wheels B' and C' C' are represented in the drawings as beveling. They will run better if so constructed and will wear longer, but may all be made with square faces. The shaft A' is left free to turn in the two projections on the frame Y shown in the drawing, while it has no other play in them and is held to them by a band as shown.

The operation of the machinery is this: While the car is running if the brake shaft R is turned, it will wind up the chain S, and pull the rod T and the lever U, and bring the short arm W against the pin Z, which will move the frame Y, the shaft A' and the wheels B' and C' C', and bring those wheels against the ends D', F' of the hubs E', G' of the cog wheels J and K so as to slide those cog wheels and the friction wheels E F and G H on the axles C, C, and bring those friction wheels into contact with the inner sides of the projections I, I on the wheels D, D, as the latter revolve. While the friction wheels are not so in contact the wheels D, D, revolve without affecting the cog wheels J, K, L and M or any of the machinery which has been described. The moment the friction wheels are brought and held in contact with the projections on the car wheels friction is created between them, which has the effect instantly to check the motion of the car wheels. If the friction wheels are pressed and held farther in by applying more force to the brake wheel, the friction between the friction wheels and the projections is of course increased. If the car is running so that the wheel D to which the friction wheel E F is applied is one of the forward wheels of a truck, the effect of pressing the friction wheels E F and G H farther in will be to cause the cog-wheel J to revolve in the same direction in which the car-wheel D with which it is connected is revolving, and that car wheel will keep on revolving in the same direction in which it was before revolving, the cog wheel L will be set revolving toward the rear of the car, the cog wheel M will be set revolving toward the front of the car, and the cog wheel K toward the rear of the car, and with the cog wheel K, the friction wheel G H and the car-wheel D to which it is attached will revolve toward the rear also. It will thus be seen that the motion of the hind wheels of the truck will be completely reversed, and those wheels will actually run backward while the forward wheels of the truck are running ahead, and that this will continue as long as the brake is applied, until the motion of the car is stopped. If the car is running so that the car wheel to which the friction wheel G H is applied is one of the forward wheels of a truck, and the brake is applied, the effect upon the friction wheels and cog wheels will be the same as before described and the car wheel to which the friction wheel E F is attached will be set running in a reverse direction; in other words, in all cases the motion of the hind wheels of the truck will be reversed.

If the two cog wheels J and K are alike in all respects, then whether the car be running either backward or forward, the brake will work equally well and with the same power and the same amount of friction, and the hind wheels will always be reversed. But if one of the cog wheels J and K has more teeth than the other, although the reversing may take place running in one direction or in either, yet there will be either a loss of convenience by requiring the car always to be run in one direction, or if it will reverse running either way, the friction and power of stopping will be less running one way than the other.

Instead of the cog gearing an endless chain or other equivalent device may be used, or the faces of the wheels J, K, L, M, may be made without cogs, and be brought into and out of contact with each other, so as to create friction between them and produce the same reverse motion in the car wheels that I have described, without the use of the friction wheels E F and G H, but these modifications would involve the substance of my invention which consists in connecting together the motion of the two pairs of wheels of the truck by the use of intermediate friction, so that they may run in connection with each other when desired.

The effect of giving the reverse motion to the car wheels is not only to stop the headway of the car much sooner than it can be done by the use of brakes which do not produce a reverse motion in the car wheels, but, by the use of my brake, the wheels can never slide upon the track, and thus the evil of wearing flat places upon the treads of the wheels which is so injurious and is attendant on the use of the ordinary brakes is entirely avoided. It requires also the application of much less power to the brake wheel to stop a car that has my brake. Moreover the place where the friction is applied by my brake is always kept dry and the brake is, therefore, always effective in wet weather, when it is most needed, and when other brakes fail. The frictional part and even the whole machinery may also be boxed up so as to exclude dust and foreign substances.

When the brake-wheel is eased up so as to withdraw the pressure of the short arm W from the pin Z, the friction wheels E F and G H are thrust back from out of the projections I, I, by means of a coiled spring H', Fig. 4, wound around the axle and pressing against the sides of the friction wheel and car wheel as shown in Fig. 4, but any other convenient way may be employed. The pushing out of the friction wheels will push back the cog wheels J and K, the wheels B' and C', C', the shaft A', the frame Y and the pin Z, so that the pin Z will push away the short arm W, until the friction wheels are thrust out by the springs, which must be sufficient to do so, so far as to be no longer in contact with the projections, when the cog wheels will cease running. The frame Y may also be hung out of perpendicular so as to fall back by gravity, or it may be pulled or pushed back by a spring or in some other convenient way, and thus assist in freeing the friction wheels.

Figs. 2 and 3 show another mode of constructing the friction wheel. In Fig. 2, the cogs J, J and the part I' are all firmly fastened together as one piece or they may be cast in one piece of metal; the friction wheel, E F, is made in sections or parts as shown in Fig. 3, which are bolted fast to the part I' by bolts J' as shown in Figs. 2 and 3, the bolts running from the outside, as at J', Fig. 3, through the sections and the part I', and being fastened on the inside by nuts, as shown at J', Fig. 2. These sections are best made of wood, but may be of metal, and are beveled on their outer faces, as shown in Figs. 2 and 3, in like manner as the outer face of the friction wheel E F in Fig. 4 is beveled. The sections should fill the whole or a large portion of the circumference of the wheels. The advantage of this mode of construction is that as the outer faces of the sections wear by friction, the sections may be moved outward nearer to the projection I, I, by means of set-screws, as at K', Figs. 2 and 3. For this purpose the sections E F if of wood, should be faced with iron on the inside, and where the bolts J' run through the part I' there should be slots to allow the bolts to move outward with the sections. By this means also the wearing parts of the friction wheel may be easily renewed without much expense.

The projection which embraces the friction wheel may be in the shape shown in Fig. 2, and of whatever shape it is and on whatever wheel, whether single or double plate or spoke or any other wheel, may either be cast upon and with the car wheel or be bolted to it, or, instead of its being fixed on to the car wheel at all, there may be a separate socket for the friction wheel, as shown in Fig. 2, which socket must be keyed or fastened firmly to the axle of the car-wheel.

Having thus fully described the nature of my invention and the construction and operation of its parts, what I claim as my invention and desire to secure by Letters Patent is—

The fixed and sliding rubbers upon the adjacent axles of a rail-road car in combination with the intermediate cog wheels, the whole arranged and operating substantially as herein set forth.

BIRDSILL HOLLY.

Witnesses:
A. FAILING,
N. I. MILLIKEN.